UNITED STATES PATENT OFFICE.

GEORG EGLY, OF BERLIN, GERMANY, ASSIGNOR TO GEBRÜDER SIEMENS & CO., OF CHARLOTTENBURG, GERMANY.

METHOD OF MANUFACTURING DYNAMO-BRUSHES, &c.

942,379.     Specification of Letters Patent.     Patented Dec. 7, 1909.

No Drawing.    Application filed January 25, 1907.    Serial No. 354,128.    (Specimens.)

*To all whom it may concern:*

Be it known that I, GEORG EGLY, a subject of German Emperor, residing at Frankfurter Allee 154/155, Berlin, Germany, have invented certain new and useful Methods of Manufacturing Dynamo-Brushes, Sliding Contacts, and Similar Electrically-Conducting Bodies, &c., of which the following is a specification.

The present invention relates to a method of manufacturing dynamo brushes, sliding contacts and similar electrically conducting bodies which are subjected to friction, and has for its object to render the resulting products more suitable for the purposes to which they are applied.

In accordance with the present invention silicon is added to the carbon in the manufacture of carbon brushes, sliding contacts and similar electrically conducting parts which are exposed to friction. The silicon is finely ground or powdered and is very intimately mixed with the carbon, and the mixture thus obtained then undergoes the processes of molding and heating in the usual manner. Carbons which are obtained in this manner which contain a percentage of silicon are very hard and are excellent means for polishing a commutator.

In accordance with the present invention it is preferable to heat the molded mixture of carbon and silicon in a nitrogenous atmosphere, or in pure nitrogen, in order to convert the silicon into a compound of silicon and nitrogen or into a compound of nitrogen, silicon and carbon. In this manner a very uniform binding of the entire mass and great homogeneity of the body is obtained.

The kind of compound which is formed by nitrogen combining with silicon may be very different; when a sufficient quantity of silicon is employed and when the mixture is sufficiently heated, apparently the chemical compound $C_2Si_2N$ is formed.

The quantity of silicon which is to be mixed with the carbon depends entirely on the properties which the finished brush or sliding contact is to have. Generally speaking it may be said that with an increasing percentage of silicon the hardness of the finished body increases, whereas the conductivity decreases. For most purposes additions of from 2–5% of silicon prove quite sufficient in order to obtain a brush or sliding contact of excellent conductivity and simultaneously of great hardness and one which is capable of polishing very well.

What I claim as my invention and desire to secure by Letters Patent is:—

1. A method of manufacturing dynamo brushes and other sliding contacts, consisting in mixing powdered silicon intimately with powdered carbon, in molding the mixture thus obtained and in heating said mixture in a nitrogenous atmosphere.

2. A method of manufacturing dynamo brushes and other sliding contacts, consisting in mixing triturated silicon intimately with powdered carbon, in molding the mixture thus obtained and in heating said mixture in nitrogen.

In testimony whereof I have signed my name to this specification in the presence of the two subscribing witnesses.

GEORG EGLY.

Witnesses:
WOLDEMAR HAUPT,
HENRY HASPER.